April 24, 1956 C. F. FOGARTY 2,743,035
EXPLOSION PROOF BATTERY ENCLOSURE
Filed Oct. 9, 1952
FIG. I
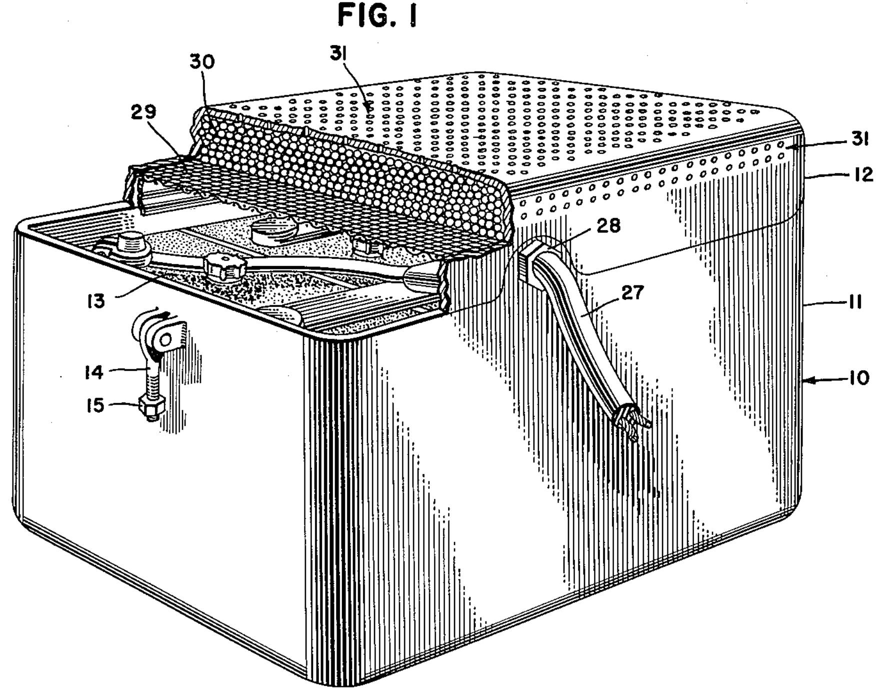
FIG. 2
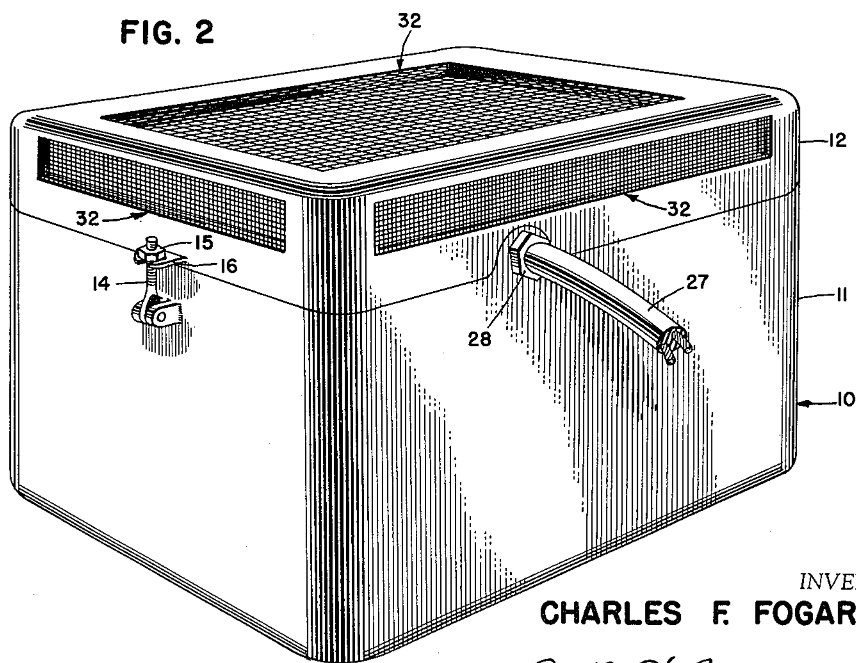
INVENTOR
CHARLES F. FOGARTY
BY G. W. O'Brien
C. Baxter Warner
ATTORNEYS United States Patent Office 2,743,035

Patented Apr. 24, 1956

1

2,743,035

EXPLOSION PROOF BATTERY ENCLOSURE

Charles F. Fogarty, Adelphi, Md.

Application October 9, 1952, Serial No. 313,995

1 Claim. (Cl. 220—88)

(Granted under Title 35, U. S. Code (1952), sec. 266)

The invention described herein may be manufactured and used by or for the Government of the United States of America for governmental purposes without the payment of any royalties thereon or therefor.

This invention generally relates to battery containers and more particularly to a freely ventilated battery container for enabling the safe operation of a storage type battery in an explosive atmosphere.

Operating a storage battery, of the type exuding hydrogen and oxygen gases, within a surrounding atmosphere of explosive gases generally presents an enigma, for should the operating battery be directly exposed to this atmosphere, ignition of the battery gases emanating therefrom may result in ignition of the atmospheric gases with a resulting explosion, whereas should the operating battery be housed within an airtight container, the battery gases generated and confined within the container may build up to dangerous concentrations and then explode.

Heretofore, one manner of solving this problem was to provide a battery container including a compressed air cylinder. A maintenance man by periodically operating the compressed air could flush out or purge the battery generated gases. However, inasmuch as the functioning of this device depended upon the human element, it was considered unsatisfactory, for improper maintenance would still result in battery explosion.

The present invention is directed toward overcoming this problem by providing a container which is freely ventilated to permit escape of the battery gases and prevent the build up of explosive concentrations thereof, while embodying arresting means for preventing the escape of any sparks or flame emanating from within, from thereafter igniting the surrounding explosive.

It is accordingly one object of this invention to provide an enclosure for enabling the safe operation of a storage type battery in an explosive atmosphere.

Another object of this invention is to provide a compact, readily detachable container for safely housing a combustible gas exuding battery in an explosive atmosphere.

Still another object of this invention is to provide a battery container having openings therein to enable the release of gases, in conjunction with arrestors for confining sparks or flames within.

Other objects and many of the attendant advantages of this invention will be readily appreciated as the same becomes understood by reference to the following detailed description when considered in connection with the accompanying drawings wherein:

Fig. 1 is a perspective view with a portion broken away of a proposed embodiment of the present invention; and Fig. 2 is a perspective view of a slightly modified construction.

Referring now to Fig. 1 for a detailed consideration of one preferred embodiment of the present invention, a container 10 which may be formed of case 11 and cover 12, as shown, serves as a housing for snugly re-

2 ceiving a battery 13, preferably of the storage type having conventional terminal posts, cables, and filling caps. Fasteners which may include a plurality of threaded bolts 14 and nuts 15, as shown, are hingedly mounted about the periphery of the case 11 adjacent the opening thereof, to engage outstanding bifurcated spades 16, mounted on the cover 12, and thereby effect a quick disconnect rigid fastening between case and cover.

A screen 29 or other foraminous support is mounted in any suitable manner a preselected distance below the top of a cover 12 which is perforated as shown by 31 thereby forming a ventilated chamber therein above the battery. Within this chamber intermediate screen 29 and top of cover 12 are loosely placed a plurality of balls 30 preferably of glass or metal, having relatively smooth reflecting surfaces of greater diameter than the foramina of screen 29 and the apertures 31 of perforated cover 12 thereby preventing the escape of the balls therethrough.

The embodiment illustrated in Fig. 2 is similar to that of Fig. 1 except that separate inserted grate members 32 provide for the necessary plurality of apertures in the top and side portions of the cover 12 which together with screen 29 form the ventilated chamber. The foramina of screen 29 and the apertures 31 of Fig. 1 and 32 of Fig. 2 are of such size and diameter as to permit free ventilation of the chamber simultaneously preventing passage of the contained balls therethrough.

In operation, the numerous interstices intermediate the balls form tortuous passages for the escape of gases therethrough, while these broken nonlinear passages prevent the transit of sparks or flame to the outer atmosphere by deflecting the same off the polished ball surfaces in the path thereof.

Inasmuch as the diffusion rate of hydrogen gas is relatively high, an ignition thereof occurs with extreme rapidity whereby the flame quenching action provided by the balls is more dependent upon the ball deflecting surface areas than the heat conductivity thereof. In practice it has been found that a flame arrestor of this type, employing a chamber of approximately 2 to 4 inches in depth and containing glass balls approximately $\frac{3}{16}$ inch in diameter, performed satisfactorily in safely ventilating a battery of the type emanating highly diffusible hydrogen and oxygen gas within a surrounding of highly explosive gases.

Obviously many modifications and variations of the present invention are possible in the light of the above teachings. It is therefore to be understood that within the scope of the appended claim the invention may be practiced otherwise than as specifically described.

What is claimed is:

An explosion proof battery receptacle for safely housing an oxygen and hydrogen gas exuding battery within an explosive atmosphere comprising, a container including a case and cover therefor, said cover having a top portion and downwardly depending sides adapted to engage said case in tight sealed relationship, said top portion having a plurality of vertical openings therethrough, the openings being closely spaced and disposed substantially across the entire upper surface of the top portion of the cover, each of said openings having a diameter less than $\frac{3}{16}$ of an inch to prevent passage of balls therethrough, a horizontal support member having a plurality of closely spaced apertures across substantially its entire surface, said support being disposed within the cover in parallel relationship to the top portion of the cover, the horizontal support member extending from side to side and end to end of the cover and affixed to the depending sides at a distance of from 2 to 4 inches from said top portion of the cover to form a chamber therebetween, each of the apertures in the support member having a diameter less than $\frac{3}{16}$ of an inch to prevent passage of balls therethrough, and a plurality of glass balls having smooth reflecting surfaces within the chamber, said glass balls completely filling the chamber such that their surfaces contact one another to form a plurality of extended nonlinear passages through the chamber, each of said glass balls having a diameter substantially yet at least not less than $\frac{3}{16}$ of an inch, whereby battery gases originating from within the container during normal operation of the battery will be freely vented through the passages whereas flames generated from within are prevented from escaping therefrom to the explosive atmosphere.

References Cited in the file of this patent

UNITED STATES PATENTS

| | | |
|---|---|---|
| 1,399,702 | Eaton | Dec. 6, 1921 |
| 1,501,832 | Amend | July 15, 1924 |
| 2,044,537 | Dunin | June 16, 1936 |
| 2,151,180 | Aushicks | Mar. 21, 1939 |
| 2,452,066 | Murphy | Oct. 26, 1948 |

FOREIGN PATENTS

| | | |
|---|---|---|
| 396,157 | France | Apr. 3, 1909 |
| 470,386 | France | June 15, 1914 |
| 231,600 | Great Britain | Apr. 9, 1925 |